United States Patent [19]
Englander

[11] 3,747,891
[45] July 24, 1973

[54] CLAMP-ON MIRROR ASSEMBLY
[76] Inventor: Sol Englander, 147-07 77th Pl., Flushing, N.Y. 11367
[22] Filed: Feb. 25, 1972
[21] Appl. No.: 229,340

[52] U.S. Cl. ......................... 248/475 R, 248/226 R
[51] Int. Cl. ......................................... B60r 1/06
[58] Field of Search .................. 248/226 B, 226 R, 248/475 R; 350/307

[56] References Cited
UNITED STATES PATENTS
2,321,861    6/1943    Sauer .......................... 248/226 B
3,056,570   10/1962    Slavin .......................... 248/226 B FOREIGN PATENTS OR APPLICATIONS
1,012,321    4/1952    France .......................... 248/475 R

*Primary Examiner*—William H. Schultz
*Attorney*—Bucknam and Archer

[57] ABSTRACT

A clamp-on mirror assembly having a mirror connected to a support rod which in turn is secured to the drain channel of an automobile by an adjustable clamp at the end of the rod.

3 Claims, 2 Drawing Figures

PATENTED JUL 24 1973　　　　　　　　　　　　3,747,891

CLAMP-ON MIRROR ASSEMBLY

BACKGROUND AND SUMMARY OF THE INVENTION

This invention relates in general to a mirror assembly for a vehicle, and more particularly to a clamp-on mirror assembly that can be secured to the drain channel of an automobile.

In the prior art there are a variety of mirror assemblies which can be installed upon vehicles and which function suitably. However, many known automobile mirror units require drilling holes into the body for installation, and are commonly secured to the auto body by self-tapping screws having exposed heads. These features make such mirror units not only troublesome to install, but also easy to steal by anyone so inclined and possessing a screwdriver.

The invention provides a clamp-on mirror assembly that requires no hole drilling for installation and which when installed is relatively theft-proof.

According to a preferred embodiment of the invention, there is provided a rod, a mirror connected to the rod for support thereby, and an adjustable clamp means supported by the rod at one end thereof. The clamp means is operable to engage and grip the drain channel on the automobile body to secure the rod thereto and extending therefrom. By connecting the mirror to the rod with a friction swivel type fastening means, the mirror can be easily adjusted as required for driving, without changing the position of the clamp means along the channel.

The clamp means has no exposed screws that allow its removal from the drain channel once installed and is secured to the channel by tightening a nut with a hook-in spanner wrench. The exposed surface of this nut is smooth and cylindrical so that it is not easily turned except by the proper spanner wrench which is designed to reach into detent holes in the nut.

For a better understanding of the invention and its various advantages, reference should be had to the accompanying drawing and following detailed description which exemplify a preferred embodiment of the invention.

DESCRIPTION OF A PREFERRED EMBODIMENT OF THE INVENTION

Figure 1:
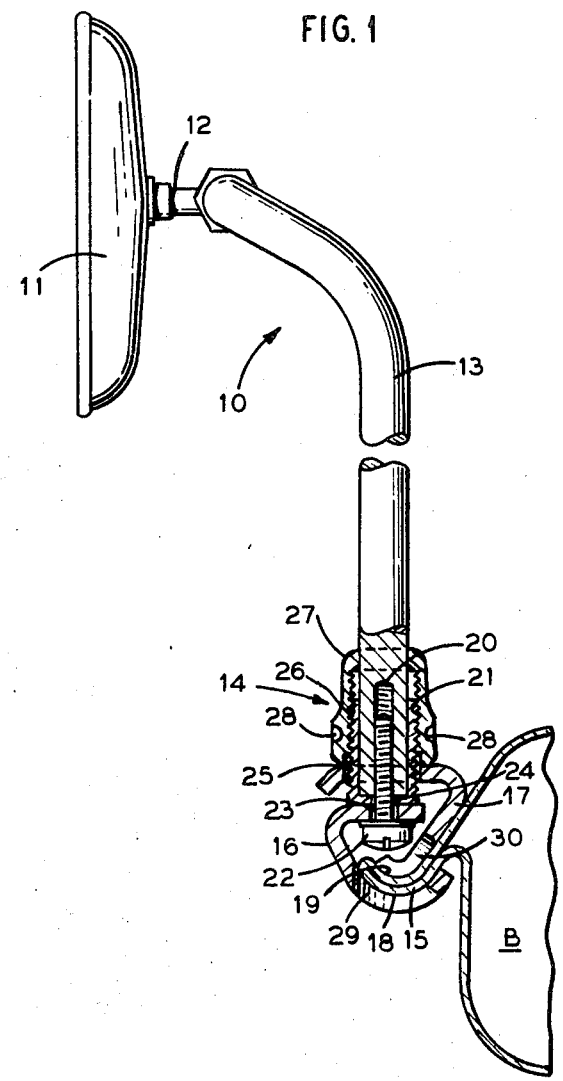
FIG. 1 is a longitudinal view, partly in section, of a clamp-on mirror assembly according to a preferred embodiment of the invention, as seen installed upon the drain channel of an automobile.
Figure 2:
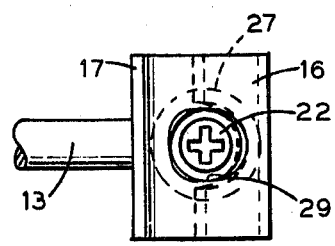
FIG. 2 is an end view of the mirror assembly shown in FIG. 1, as seen removed from the automobile drain channel.

FIGS. 1 and 2 illustrate a clamp-on mirror assembly 10 in which a mirror 11 is connected by a swivel fastener 12 to a rod 13 for support thereby, and the rod 13 supports at one end an adjustable clamp means 14.

Clamp means 14 is operable to engage and grip a drain channel 15 on an automobile body B to secure the rod 13 thereto. It will be understood by those skilled in the art that the mirror assembly 10 is not restricted for use with automobiles but can be mounted on any base means having a channel similar to channel 15.

The gripping action of clamp means 14 is effected by two clamp members 16 and 17. Clamp member 16 is arranged for bearing against the outside surface 18 of channel 15, and clamp member 17 is arranged for bearing against the inside surface 19 of channel 15.

For mounting the clamp members 16 and 17 the end of rod 13 is drilled and tapped at 20, and an externally threaded sleeve 21 is press-fitted or otherwise secured upon the end portion of rod 13. Clamp member 16 is secured to the end of rod 13 by a screw 22 that extends through passage 23 in clamp member 16 and passage 24 in the end of sleeve 21, and is received in threads 20. Clamp member 17 has a passage 25 that is somewhat oversize for the threads 26 of sleeve 21, such that when nut 27 is turned on threads 26 away from the end of rod 13, clamp member 17 can be shifted along rod 13 relative to clamp member 16 to facilitate slipping the channel 15 between the clamp members 16 and 17.

With the channel 15 positioned between clamp members 16 and 17, nut 27 is turned in engagement with threads 26 to advance toward the end of rod 13 and press clamp member 17 into bearing engagement with the inside surface 19 of channel 15.

Thus, the invention provides one clamp member 16 that is fixed to the end of rod 13 and which serves to press against the outside of the channel 15, and a second clamp member 17 that is adjustable to fit with channels 15 of different thickness, this second clamp member being moveable relative to rod 13 and inside both channel 15 and clamp member 16 to press against the inside of channel 15.

To provide a more theft-proof mirror assembly 10, the outside surface of nut 27 is a surface of revolution and there are provided a pair of detent holes 28 for receiving a hook-in spanner wrench (not shown) used for tightening nut 27. Thus, once nut 27 is tightened to install mirror assembly 10 upon channel 15, the nut 27 cannot readily be loosened to permit removal of assembly 10, except by use of a suitable spanner wrench.

As can be seen better from FIG. 2, the clamp members 16 and 17 are cut away at 29 and 30 respectively to allow insertion of a screw driver (not shown) for tightening screw 22. However, it should be noted that when clamp means 14 is in its installed configuration as shown by FIG. 1, the presence of channel 15 between clamp members 16 and 17 blocks access to the head of screw 22.

From the foregoing description, it will become apparent to those skilled in the art that the clamp-on mirror assembly 10 of this invention can be embodied in other obvious ways to satisfy the requirements for a particular installation.

What is claimed is:

1. A clamp-on mirror assembly which comprises a rod, a mirror connected to said rod for support thereby, a pair of clamp members supported by said rod at one end thereof and cooperating to engage and grip a channel on a base means to secure the rod thereto, a first one of said clamp members being connected to the end of the rod by a threaded fastener received by an internally threaded portion of the rod, and the second of said clamp members being adjustable along an externally threaded portion on the rod, said first clamp member having a curved surface disposed for bearing engagement with the outside surface of the channel, said second clamp member having a curved surface extending in opposite overlapping relation to that of the first clamp member and disposed for bearing engagement with the inside surface of the channel, and a nut disposed for engagement with the externally threaded portion on the rod, said nut being adjustable to press said second clamp member into bearing engagement with the inside surface of said channel.

2. A clamp-on mirror assembly according to claim 4 wherein said first and second clamp members are cut away to define a clearance for installing said threaded fastener.

3. A clamp-on mirror assembly according to claim 4 wherein said nut has an exterior surface that is a surface of revolution, and a plurality of detent holes located to receive a predetermined tool for turning the nut.

* * * * *